(12) United States Patent
Oshida

(10) Patent No.: US 12,162,486 B2
(45) Date of Patent: Dec. 10, 2024

(54) CONTROLLER AND CONTROL METHOD

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 767 days.

(21) Appl. No.: 17/270,569

(22) PCT Filed: Aug. 10, 2019

(86) PCT No.: PCT/IB2019/056824
§ 371 (c)(1),
(2) Date: Feb. 23, 2021

(87) PCT Pub. No.: WO2020/039301
PCT Pub. Date: Feb. 27, 2020

(65) Prior Publication Data
US 2021/0284154 A1    Sep. 16, 2021

(30) Foreign Application Priority Data
Aug. 23, 2018   (JP) ................................ 2018-155988

(51) Int. Cl.
*B60W 30/16*     (2020.01)
*B60T 8/24*      (2006.01)
(Continued)

(52) U.S. Cl.
CPC ............. *B60W 30/16* (2013.01); *B60T 8/241* (2013.01); *B60T 8/261* (2013.01); *B60W 10/04* (2013.01);
(Continued)

(58) Field of Classification Search
CPC ...... B60T 8/261; B60T 8/1706; B60T 8/1766; B60T 2201/02; B60W 10/04;
(Continued)

(56) References Cited

U.S. PATENT DOCUMENTS

2013/0238206 A1*  9/2013  Lemejda ............... B60T 8/1766
                                                         701/70
2014/0200780 A1*  7/2014  Watanabe ............. B60T 8/1706
                                                         701/68
(Continued)

FOREIGN PATENT DOCUMENTS

EP            3335955 A1    6/2018
JP          2009116882 A    5/2009
(Continued)

OTHER PUBLICATIONS

International Search Report and Written Opinion for Application No. PCT/IB2019/056824 dated Nov. 15, 2019 (8 pages).

*Primary Examiner* — Anshul Sood
(74) *Attorney, Agent, or Firm* — Michael Best & Friedrich LLP

(57) ABSTRACT

The present invention obtains a controller and a control method capable of achieving appropriate cornering during adaptive cruise control of a straddle-type vehicle.
In the controller and the control method according to the present invention, during the adaptive cruise control in which the straddle-type vehicle is made to travel according to a distance from the straddle-type vehicle to a preceding vehicle, motion of the straddle-type vehicle, and a driver's instruction, at least one of braking force distribution, which is distribution of braking forces generated on wheels of the straddle-type vehicle to the front and rear wheels, and drive power distribution, which is distribution of drive power transmitted to the wheels of the straddle-type vehicle to the front and rear wheels, is controlled on the basis of lateral acceleration of the straddle-type vehicle.

8 Claims, 6 Drawing Sheets

(51) Int. Cl.
*B60T 8/26* (2006.01)
*B60W 10/04* (2006.01)
*B60W 10/18* (2012.01)

(52) U.S. Cl.
CPC .......... *B60W 10/18* (2013.01); *B60T 2201/02* (2013.01); *B60W 2300/36* (2013.01); *B60W 2520/125* (2013.01); *B60W 2720/40* (2013.01)

(58) Field of Classification Search
CPC ...... B60W 10/18; B60W 30/14; B60W 30/16; B60W 2300/36
See application file for complete search history.

(56) References Cited

U.S. PATENT DOCUMENTS

| | | |
|---|---|---|
| 2015/0112569 A1 | 4/2015 | Yamane et al. |
| 2016/0061132 A1* | 3/2016 | Hieda ............ B60W 30/18145 |
| | | 701/110 |
| 2017/0008500 A1* | 1/2017 | Iwatsuki ................. B60T 8/261 |
| 2017/0129495 A1* | 5/2017 | Eguchi ................... B62M 23/02 |
| 2017/0144665 A1* | 5/2017 | Ohashi .................... F02D 29/02 |
| 2018/0339699 A1* | 11/2018 | Matsuda ............. B60W 10/184 |

FOREIGN PATENT DOCUMENTS

| | | |
|---|---|---|
| JP | 2010012903 A | 1/2010 |
| JP | 2016034819 A | 3/2016 |
| WO | 2017200835 A1 | 11/2017 |

\* cited by examiner

[FIG. 1]
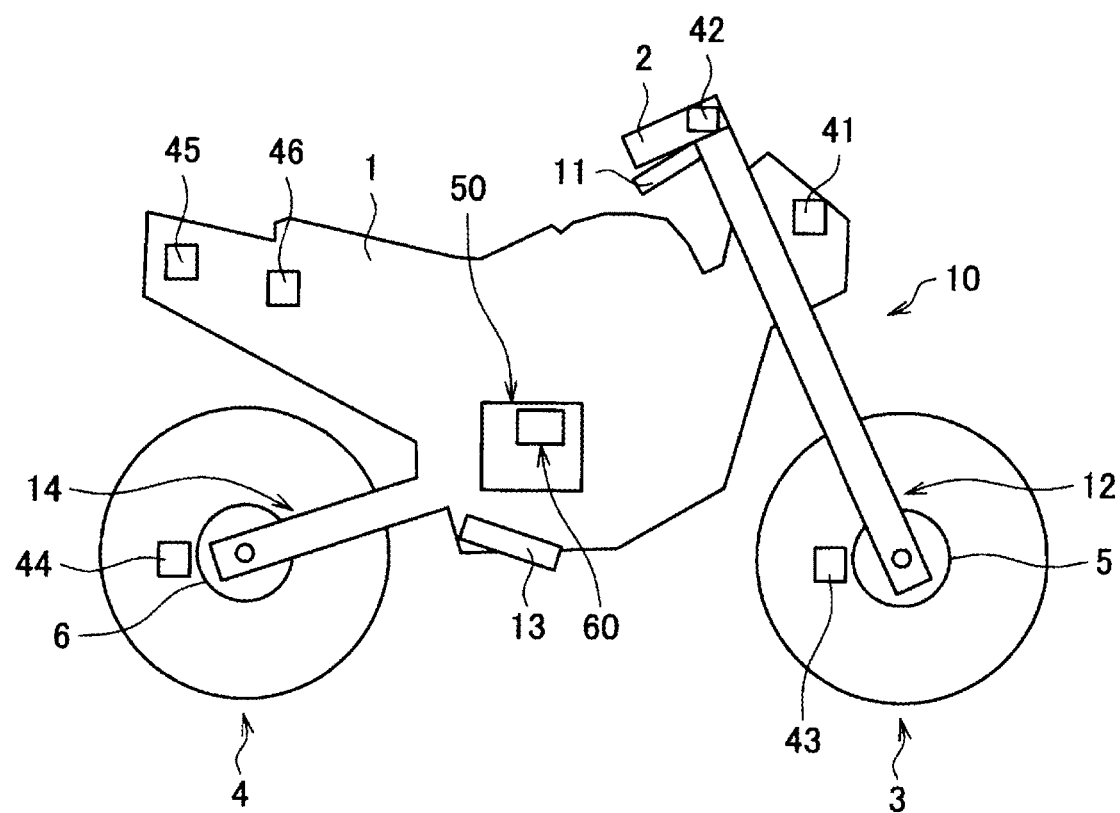

[FIG. 2]
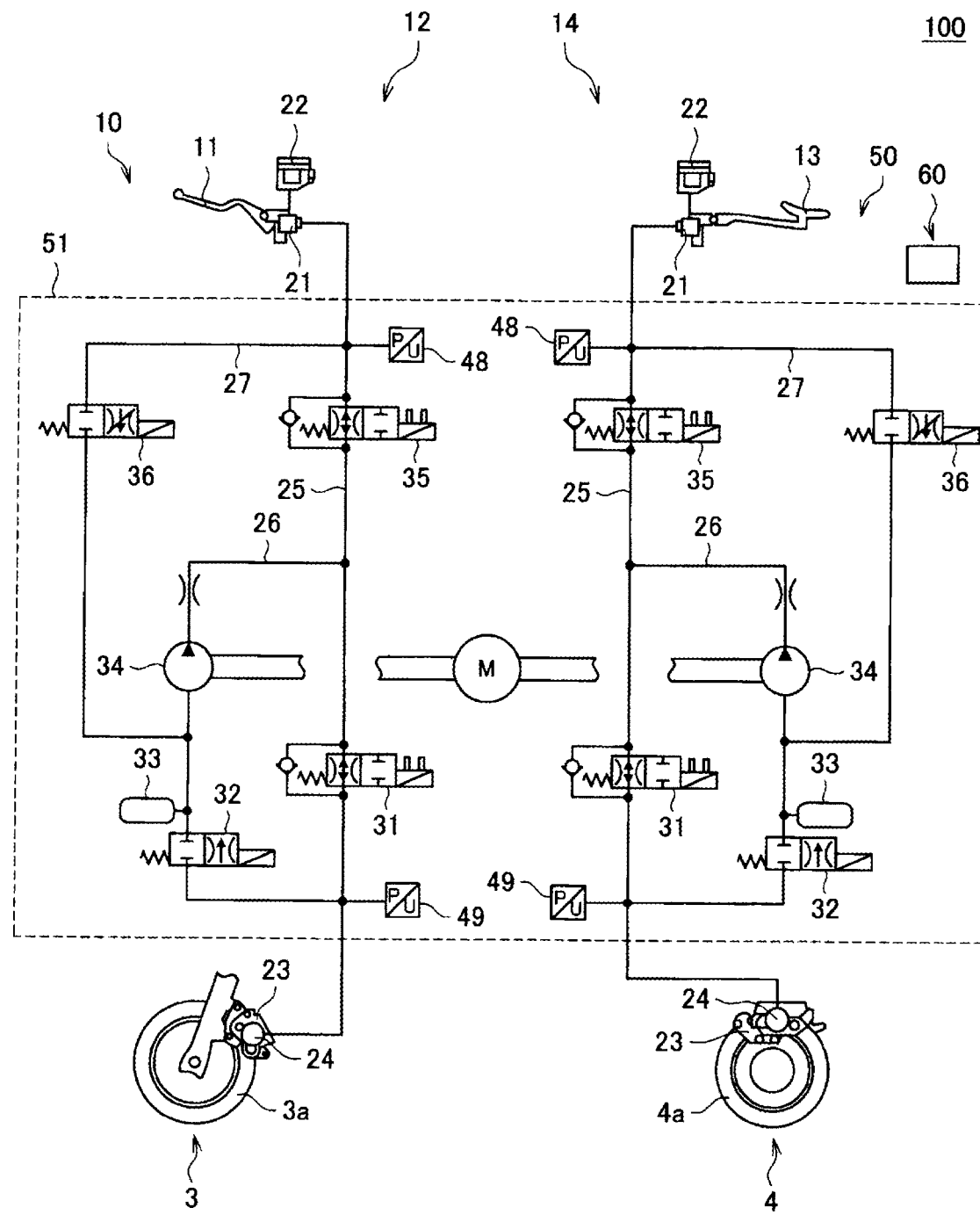

[FIG. 3]
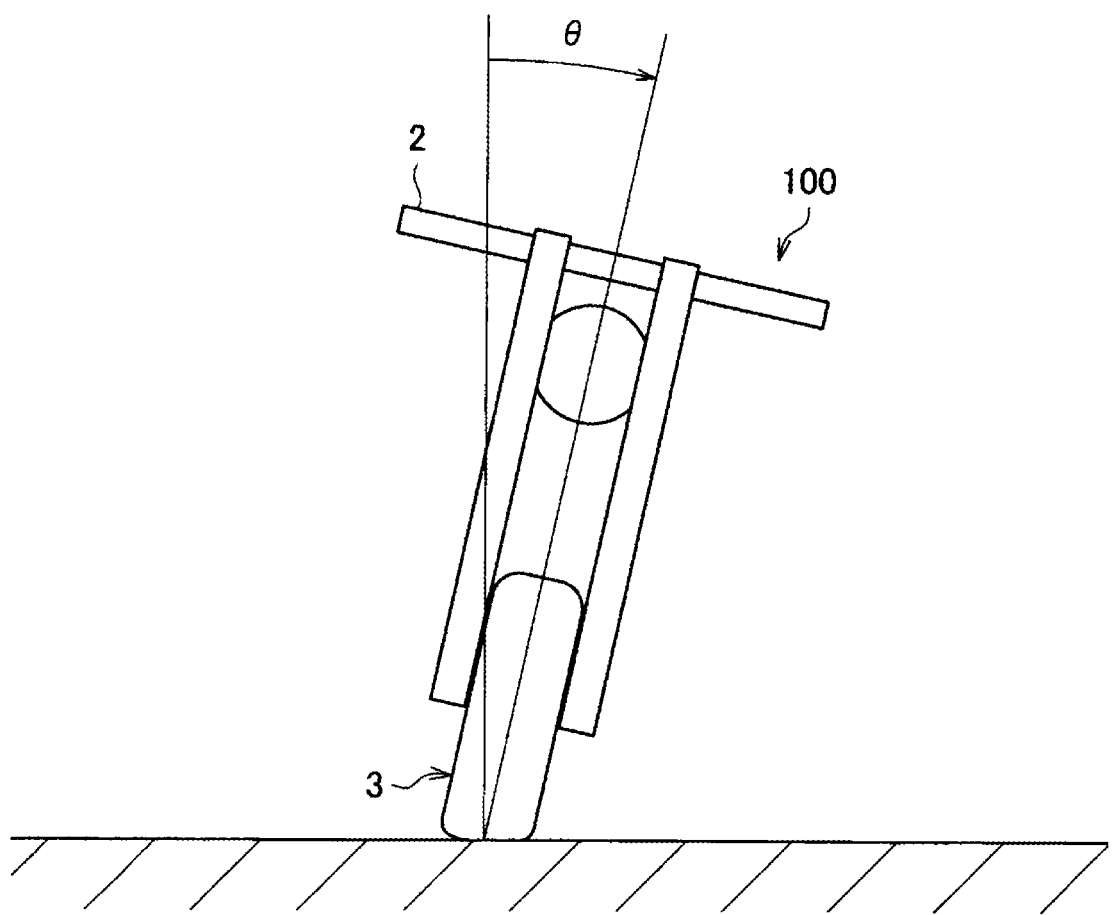

[FIG. 4]
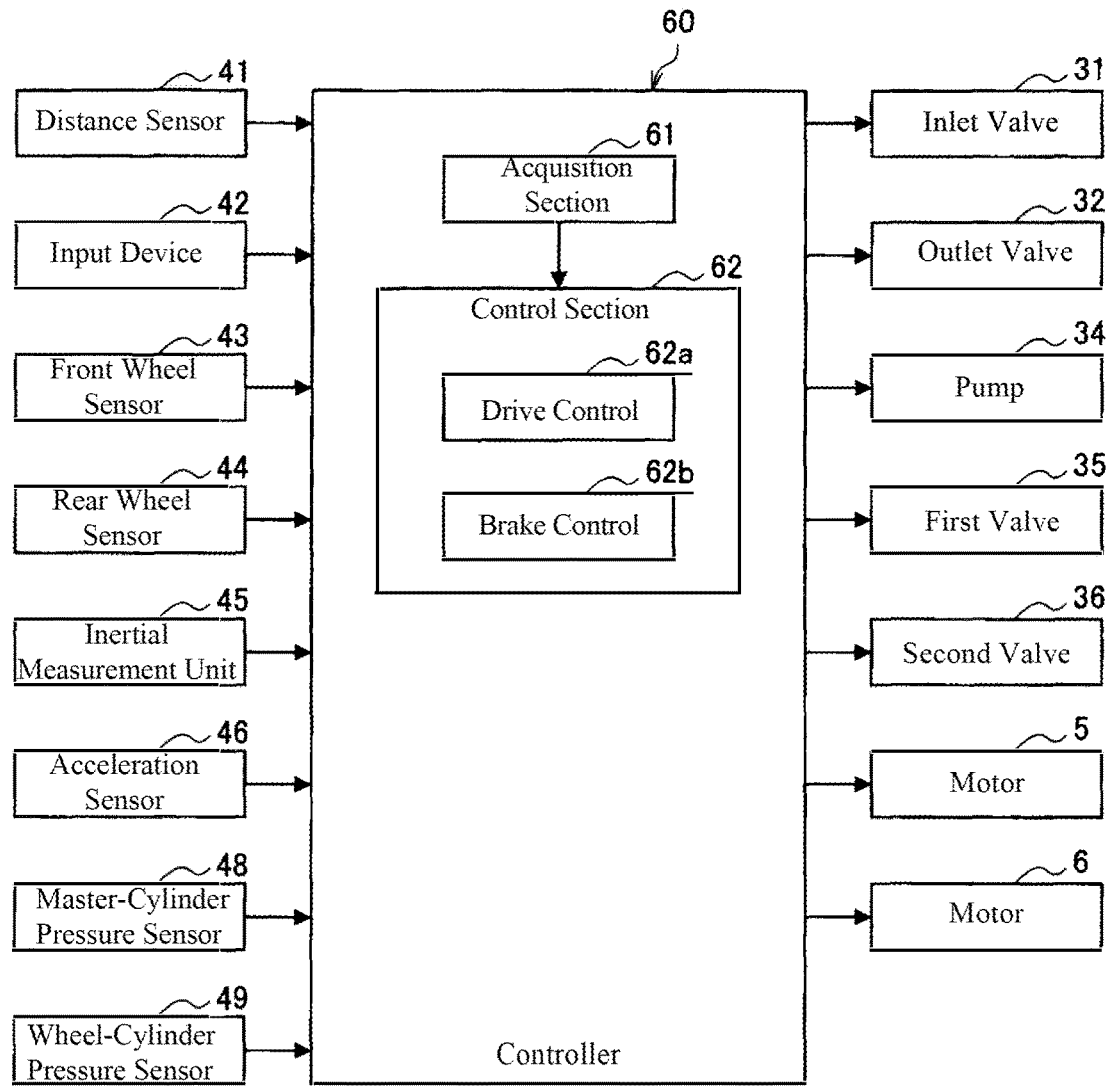
[FIG. 5]
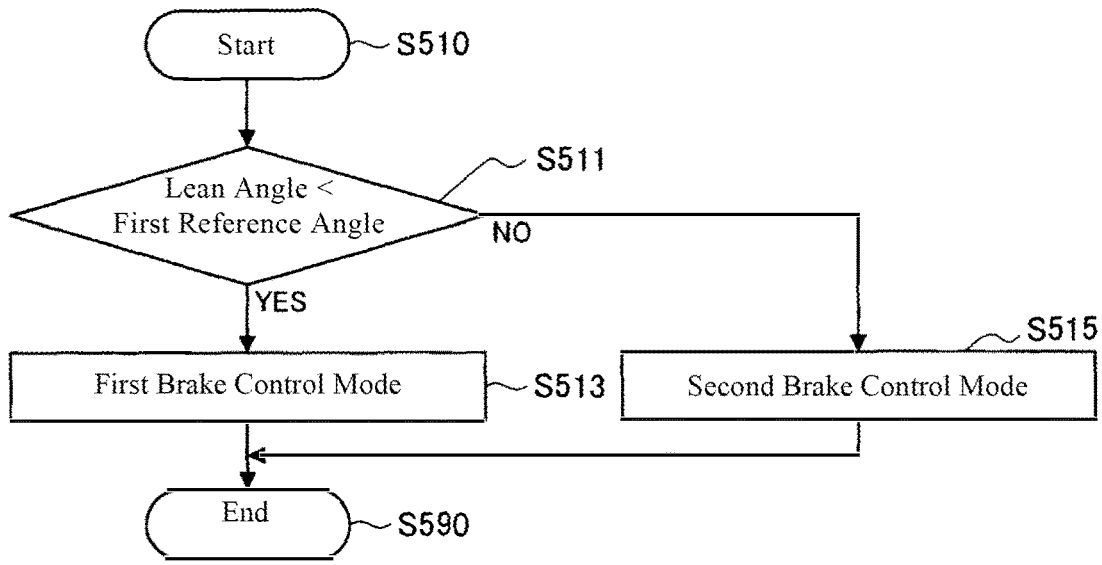

[FIG. 6]
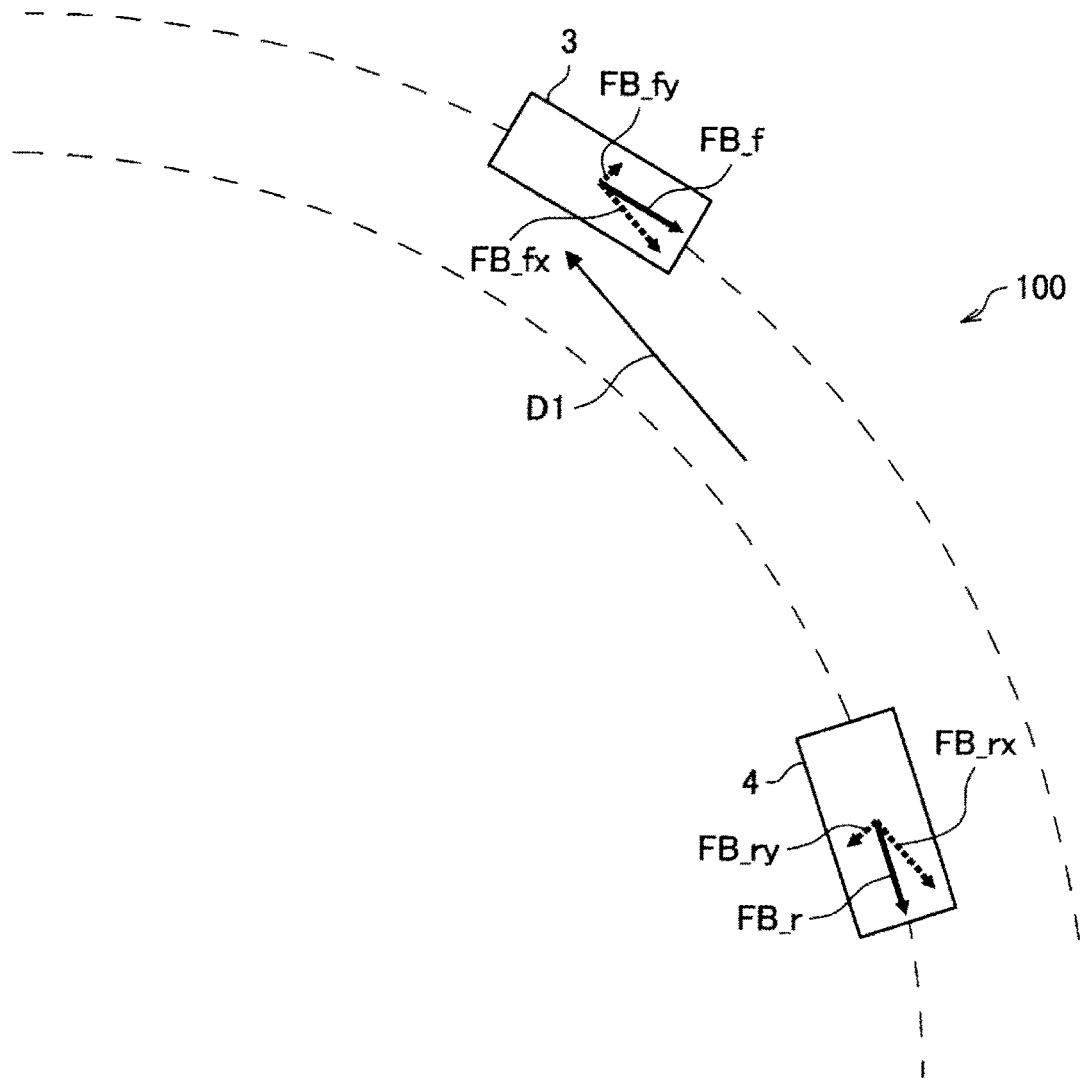
[FIG. 7]
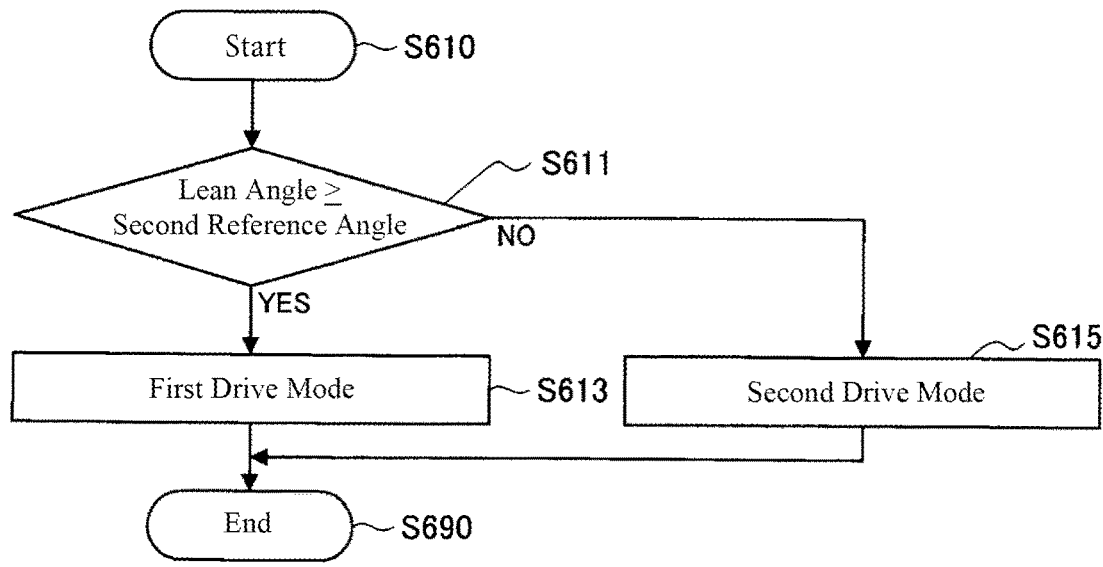

[FIG. 8]
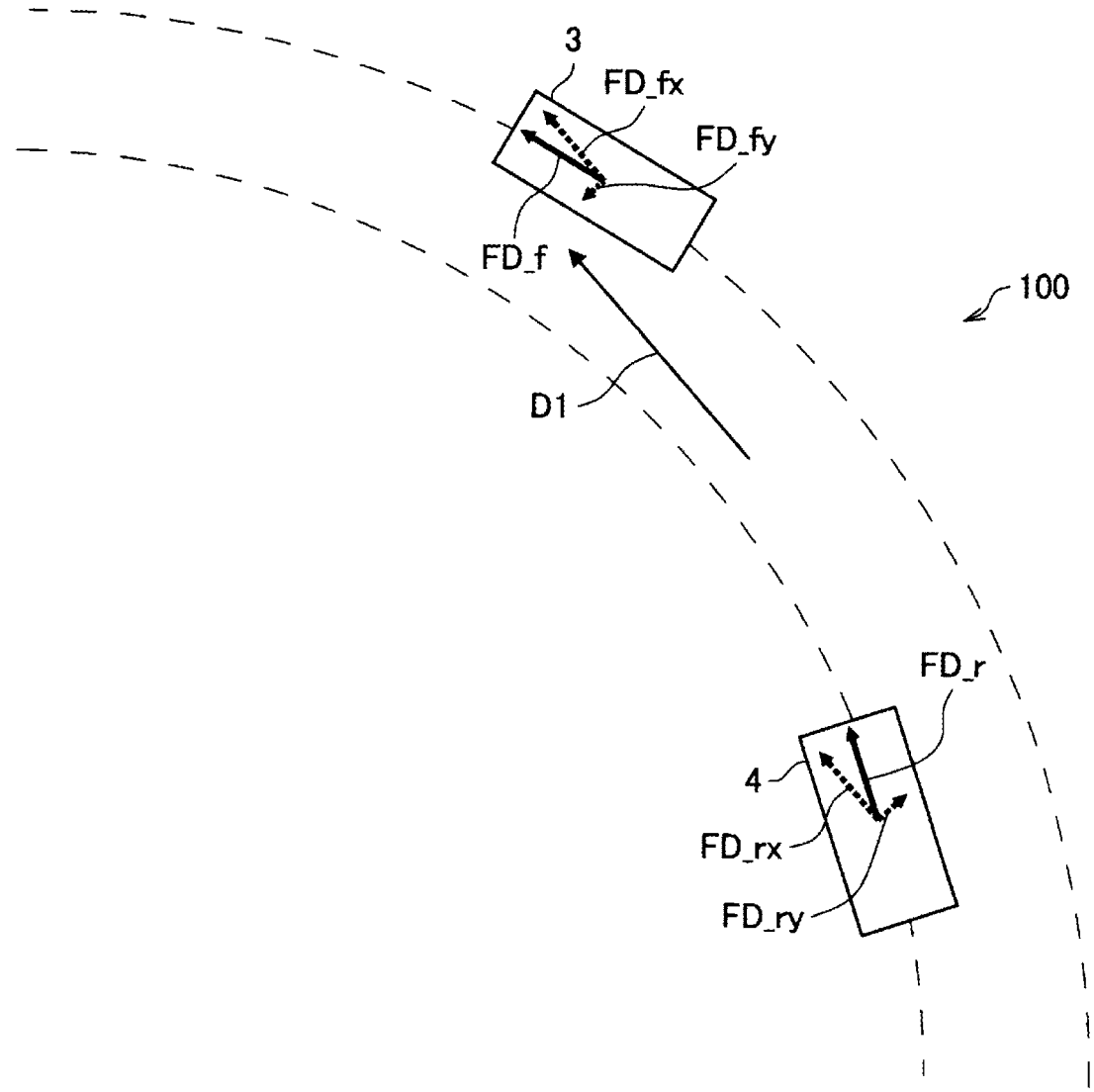

CONTROLLER AND CONTROL METHOD

BACKGROUND OF THE INVENTION

The present disclosure relates to a controller and a control method capable of achieving appropriate cornering during adaptive cruise control of a straddle-type vehicle.

As a conventional technique relating to a straddle-type vehicle, a technique of assisting with a driver's operation is available.

For example, a driver assistance system is disclosed in JP-A-2009-116882. Based on information detected by a sensor that detects an obstacle present in a travel direction or substantially in the travel direction, the driver assistance system warns a motorcycle driver that the motorcycle inappropriately approaches the obstacle.

SUMMARY OF THE INVENTION

By the way, as the technique of assisting with the driver's operation, it is considered to adopt adaptive cruise control, which makes a vehicle travel according to a distance from the vehicle to a preceding vehicle, motion of the vehicle, and the driver's instruction, for the straddle-type vehicle such as the motorcycle. In the adaptive cruise control, the vehicle is accelerated or decelerated without relying on an acceleration or deceleration operation by the driver when a braking force or drive power is automatically exerted thereon. Meanwhile, differing from a four-wheeled vehicle, for example, the straddle-type vehicle corners when the driver leans the straddle-type vehicle in a rolling direction. Here, a posture of the straddle-type vehicle in the rolling direction during cornering is influenced by the braking force or the drive power exerted on the vehicle. Thus, in the case where the braking force or the drive power that is automatically exerted on the straddle-type vehicle during the adaptive cruise control is not appropriately controlled, appropriate cornering possibly becomes difficult.

The present invention has been made in view of the above-described problem, and therefore obtains a controller and a control method capable of achieving appropriate cornering during adaptive cruise control of a straddle-type vehicle.

Solution to Problem

A controller according to the present invention is a controller that controls travel of a straddle-type vehicle, and includes a control section capable of executing adaptive cruise control in which the straddle-type vehicle is made to travel according to a distance from the straddle-type vehicle to a preceding vehicle, motion of the straddle-type vehicle, and a driver's instruction. During the adaptive cruise control, the control section controls at least one of braking force distribution, which is distribution of braking forces generated on wheels of the straddle-type vehicle to the front and rear wheels, and drive power distribution, which is distribution of drive power transmitted to the wheels to the front and rear wheels, on the basis of lateral acceleration of the straddle-type vehicle.

A control method according to the present invention is a control method for controlling travel of a straddle-type vehicle. In the control method, during adaptive cruise control in which the straddle-type vehicle is made to travel according to a distance from the straddle-type vehicle to a preceding vehicle, motion of the straddle-type vehicle, and a driver's instruction, at least one of braking force distribution, which is distribution of braking forces generated on wheels of the straddle-type vehicle to the front and rear wheels, and drive power distribution, which is distribution of drive power transmitted to the wheels to the front and rear wheels, is controlled by a controller on the basis of lateral acceleration of the straddle-type vehicle.

Advantageous Effects of Invention

In the controller and the control method according to the present invention, during the adaptive cruise control in which the straddle-type vehicle is made to travel according to the distance from the straddle-type vehicle to the preceding vehicle, the motion of the straddle-type vehicle, and the driver's instruction, at least one of the braking force distribution, which is the distribution of the braking forces generated on the wheels of the straddle-type vehicle to the front and rear wheels, and the drive power distribution, which is the distribution of the drive power transmitted to the wheels of the straddle-type vehicle to the front and rear wheels, is controlled on the basis of the lateral acceleration of the straddle-type vehicle. In this way, during cornering, it is possible to suppress the straddle-type vehicle from exhibiting behavior in a rolling direction that is unintended by the driver and is caused when the braking force or the drive power is automatically exerted on the straddle-type vehicle. Therefore, the straddle-type vehicle can appropriately corner during the adaptive cruise control of the straddle-type vehicle.

BRIEF DESCRIPTION OF THE DRAWINGS

FIG. 1 is a schematic view of a configuration of a motorcycle on which a controller according to an embodiment of the present invention is mounted.

FIG. 2 is a schematic view of a configuration of a brake system according to the embodiment of the present invention.

FIG. 3 is a view for illustrating a lean angle.

FIG. 4 is a block diagram of an exemplary functional configuration of the controller according to the embodiment of the present invention.

FIG. 5 is a flowchart of an exemplary processing flow relating to braking force distribution control that is based on lateral acceleration and executed by the controller according to the embodiment of the present invention.

FIG. 6 is a view for illustrating directions of braking forces generated on a front wheel and a rear wheel during cornering.

FIG. 7 is a flowchart of an exemplary processing flow relating to drive power distribution control that is based on the lateral acceleration and executed by the controller according to the embodiment of the present invention.

FIG. 8 is a view for illustrating directions of drive power that acts on the front wheel and the rear wheel during cornering.

DETAILED DESCRIPTION

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles. In addition, a description will hereinafter be made on a case where a motor is mounted as a drive source capable of outputting drive power for driving motorcycle wheels. However, as the drive source of the motorcycle, a drive source other than the motor (for example, an engine) may be mounted, or multiple drive sources may be mounted.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 on which a controller 60 according to an embodiment of the present invention is mounted with reference to FIG. 1 to FIG. 4.

FIG. 1 is a schematic view of the configuration of the motorcycle 100 on which the controller 60 is mounted. FIG. 2 is a schematic diagram of a configuration of a brake system 10. FIG. 3 is a view for illustrating a lean angle. FIG. 4 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; motors 5, 6; and the brake system 10. In this embodiment, the controller (ECU) 60 is provided in a hydraulic pressure control unit 50 of the brake system 10, which will be described later. As illustrated in FIG. 1 and FIG. 2, the motorcycle 100 further includes: an inter-vehicular distance sensor 41, an input device 42, a front-wheel rotational frequency sensor 43, a rear-wheel rotational frequency sensor 44, an inertial measurement unit (IMU) 45, a lateral acceleration sensor 46, a master-cylinder pressure sensor 48, and a wheel-cylinder pressure sensor 49.

Each of the motors 5, 6 corresponds to an example of the drive source for the motorcycle 100, and can output the drive power for driving the wheel. More specifically, the motors 5, 6 are respectively provided on the front wheel 3 and the rear wheel 4. An output shaft of the motor 5 is connected to the front wheel 3, and the drive power output from the motor 5 is transmitted to the front wheel 3. Meanwhile, an output shaft of the motor 6 is connected to the rear wheel 4, and the drive power output from the motor 6 is transmitted to the rear wheel 4. In detail, each of the motors 5, 6 is connected to a battery (not illustrated) via an inverter, and generation of the drive power by each of the motors 5, 6 is controlled by controlling operation of the inverter. Such operation of each of the motors 5, 6 is controlled by the controller 60. As a result, the drive power transmitted from the motor 5 to the front wheel 3 and the drive power transmitted from the motor 6 to the rear wheel 4 are controlled.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and a part of the front-wheel brake mechanism 12 and a part of the rear-wheel brake mechanism 14 are included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion of the primary channel 25 to which a downstream end of the secondary channel 26 is connected, a first valve (USV) 35 is provided. The supply channel 27 communicates between the master cylinder 21 and a portion of the secondary channel 26 on a suction side of the pump 34. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 in which those components are provided and channels constituting the primary channels 25, the secondary channels 26, and the supply channels 27 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, in a normal time (that is, when none of adaptive cruise control and anti-lock brake control, which will be described later, is executed), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The inter-vehicular distance sensor 41 detects a distance from the motorcycle 100 to a preceding vehicle. The inter-vehicular distance sensor 41 may detect another physical quantity that can substantially be converted to the distance from the motorcycle 100 to the preceding vehicle. Here, the preceding vehicle means a vehicle ahead of the motorcycle 100 and may include, in addition to the nearest vehicle from the motorcycle 100 on the same lane as a travel lane of the motorcycle 100, a vehicle ahead of several vehicles in front of the motorcycle 100, a vehicle traveling on an adjacent lane to the travel lane of the motorcycle 100, and the like. For example, in the case where the multiple vehicles exist ahead of the motorcycle 100, based on a track, which is estimated as a travel track of the motorcycle 100, and behavior of each of the multiple vehicles, the inter-vehicular distance sensor 41 selects the preceding vehicle as a detection target of the distance from the motorcycle 100. In this case, the adaptive cruise control, which will be described later, is executed by using a detection result of the distance from the motorcycle 100 to the thus-selected preceding vehicle.

As the inter-vehicular distance sensor 41, for example, a camera that captures an image in front of the motorcycle 100 and a radar that can detect a distance from the motorcycle 100 to a target in front are used. In such a case, for example, the preceding vehicle is recognized by using the image captured by the camera. Then, by using the recognition result of the preceding vehicle and a detection result by the radar, the distance from the motorcycle 100 to the preceding vehicle can be detected. The inter-vehicular distance sensor 41 is provided in a front portion of the trunk 1, for example. Note that the configuration of the inter-vehicular distance sensor 41 is not limited to the above example, and a stereo camera may be used as the inter-vehicular distance sensor 41, for example.

The input device 42 accepts a travel mode selection operation by the driver, and outputs information indicative of the travel mode selected by the driver. As will be described later, in the motorcycle 100, the controller 60 can execute the adaptive cruise control. The adaptive cruise control is control in which the motorcycle 100 is made to travel according to the distance from the motorcycle 100 to the preceding vehicle, motion of the motorcycle 100, and the driver's instruction. By using the input device 42, the driver can select, as one of the travel modes, a travel mode in which the adaptive cruise control is executed. For example, as the input device 42, a lever, a button, a touch screen, or the like is used. The input device 42 is provided on the handlebar 2, for example.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The front-wheel rotational frequency sensor 43 is provided on the front wheel 3.

The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The rear-wheel rotational frequency sensor 44 is provided on the rear wheel 4.

The inertial measurement unit 45 includes a three-axis gyroscope sensor and a three-directional acceleration sensor, and detects a posture of the motorcycle 100. For example, the inertial measurement unit 45 detects the lean angle of the motorcycle 100, and outputs a detection result. The inertial measurement unit 45 may detect another physical quantity that can substantially be converted to the lean angle of the motorcycle 100. For example, the lean angle corresponds to a tilt angle $\theta$ of the motorcycle 100 in a rolling direction with respect to an upper vertical direction illustrated in FIG. 3. The inertial measurement unit 45 is provided in the trunk 1, for example. In the motorcycle 100, instead of the inertial measurement unit 45, a sensor that only has a function of detecting the lean angle may be used.

The lateral acceleration sensor 46 detects lateral acceleration of the motorcycle 100, and outputs a detection result. The lateral acceleration sensor 46 may detect another physical quantity that can substantially be converted to the lateral acceleration of the motorcycle 100. The lateral acceleration is a component of acceleration, which is generated on the motorcycle 100, in a lateral direction (that is, a vehicle width direction) of the motorcycle 100. The lateral acceleration sensor 46 is provided in the trunk 1, for example.

The master-cylinder pressure sensor 48 detects the hydraulic pressure of the brake fluid in the master cylinder 21, and outputs a detection result. The master-cylinder pressure sensor 48 may detect another physical quantity that can substantially be converted to the hydraulic pressure of the brake fluid in the master cylinder 21. The master-cylinder pressure sensor 48 is provided in each of the front-wheel brake mechanism 12 and the rear-wheel brake mechanism 14.

The wheel-cylinder pressure sensor 49 detects the hydraulic pressure of the brake fluid in the wheel cylinder 24, and outputs a detection result. The wheel-cylinder pressure sensor 49 may detect another physical quantity that can substantially be converted to the hydraulic pressure of the brake fluid in the wheel cylinder 24. The wheel-cylinder pressure sensor 49 is provided in each of the front-wheel brake mechanism 12 and the rear-wheel brake mechanism 14.

The controller 60 controls travel of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 4, the controller 60 includes an acquisition section 61 and a control section 62, for example.

The acquisition section 61 acquires information that is output from each of the devices mounted on the motorcycle 100, and outputs the acquired information to the control section 62. For example, the acquisition section 61 acquires the information output from the inter-vehicular distance sensor 41, the input device 42, the front-wheel rotational frequency sensor 43, the rear-wheel rotational frequency sensor 44, the inertial measurement unit 45, the lateral acceleration sensor 46, the master-cylinder pressure sensor 48, and the wheel-cylinder pressure sensor 49.

The control section 62 controls operation of each of the devices mounted on the motorcycle 100, so as to control the drive power and the braking force exerted on the motorcycle 100.

Here, by controlling the operation of each of the devices mounted on the motorcycle 100, the control section 62 can execute the adaptive cruise control in which the motorcycle 100 is made to travel according to the distance from the motorcycle 100 to the preceding vehicle, the motion of the motorcycle 100, and the driver's instruction. More specifically, in the case where the driver selects the travel mode in which the adaptive cruise control is executed, the control section 62 executes the adaptive cruise control. Note that, in the case where the driver performs an accelerator operation or a brake operation during the adaptive cruise control, the control section 62 cancels the adaptive cruise control.

In the adaptive cruise control, the distance from the motorcycle 100 to the preceding vehicle is controlled to approximate a reference distance. As the distance from the motorcycle 100 to the preceding vehicle, the reference distance is set to a value with which the driver's safety can be secured. In the case where no preceding vehicle is recognized, a speed of the motorcycle 100 is controlled at a set speed, which is set in advance. In addition, in the adaptive cruise control, each of the acceleration and the deceleration of the motorcycle 100 is controlled to be equal to or lower than an upper limit value of such extent that does not worsen the driver's comfort.

More specifically, during the adaptive cruise control, the control section 62 calculates a target value of the acceleration (hereinafter referred to as target acceleration) or a target value of the deceleration (hereinafter referred to as target deceleration) on the basis of a comparison result between the distance from the motorcycle 100 to the preceding vehicle and the reference distance and on the basis of a relative speed between the motorcycle 100 and the preceding vehicle. Then, based on a calculation result, the control section 62 controls the drive power and the braking force exerted on the motorcycle 100.

For example, in the case where the distance from the motorcycle 100 to the preceding vehicle is longer than the reference distance, the control section 62 calculates the target acceleration that corresponds to a difference between the distance from the motorcycle 100 to the preceding vehicle and the reference distance. On the other hand, in the case where the distance from the motorcycle 100 to the preceding vehicle is shorter than the reference distance, the control section 62 calculates the target deceleration that corresponds to the difference between the distance from the motorcycle 100 to the preceding vehicle and the reference distance.

The control section 62 includes a drive control section 62a and a brake control section 62b, for example.

The drive control section 62a controls the drive power that is transmitted to each of the wheels during the adaptive cruise control. More specifically, during the adaptive cruise control, the drive control section 62a outputs a command to motor control unit (not illustrated), which outputs a signal to control operation of each of the motors 5, 6, so as to control the operation of the motors 5, 6. As a result, during the adaptive cruise control, the drive power, which is transmitted to each of the front wheel 3 and the rear wheel 4, is controlled.

In the normal time, the motor control unit controls the operation of the motors, 5, 6 such that the drive power is transmitted to each of the wheels in response to the driver's accelerator operation.

Meanwhile, during the adaptive cruise control, the drive control section 62a controls the operation of the motors 5, 6 such that the drive power is transmitted to each of the wheels without relying on the driver's accelerator operation. More specifically, during the adaptive cruise control, the drive control section 62a controls the operation of the motors 5, 6 such that the acceleration of the motorcycle 100 becomes the target acceleration, which is calculated on the basis of the distance from the motorcycle 100 to the preceding vehicle and the relative speed between the motorcycle 100 and the preceding vehicle. In this way, the drive control section 62a controls the drive power transmitted to each of the wheels.

Here, during the adaptive cruise control, the drive control section 62a separately controls the operation of each of the motors 5, 6. In this way, the drive control section 62a can separately control the drive power that is output from each of the motor 5 and the motor 6, and thus can control drive power distribution that is distribution of the drive power transmitted to the wheels to the front and rear wheels (that is, distribution of the drive power transmitted to the front wheel 3 and the drive power transmitted to the rear wheel 4). More specifically, the drive control section 62a controls the drive power distribution between the front and rear wheels such that a total of target drive power values transmitted to the wheels becomes equal to requested drive power (that is, the drive power that is requested at the time of driving the vehicle during the adaptive cruise control) corresponding to the target acceleration. The requested drive power is specifically the required drive power to bring the acceleration of the motorcycle 100 to the target acceleration, which is calculated on the basis of the distance from the motorcycle 100 to the preceding vehicle and the relative speed between the motorcycle 100 and the preceding vehicle.

The brake control section 62b controls the operation of each of the components of the hydraulic pressure control unit 50 in the brake system 10, so as to control the braking force generated on each of the wheels of the motorcycle 100.

In the normal time, as described above, the brake control section 62b controls the operation of each of the components of the hydraulic pressure control unit 50 such that the braking force is generated on each of the wheels in response to the driver's brake operation.

Meanwhile, during the adaptive cruise control, the brake control section 62b controls the operation of each of the components such that the braking force is generated on each of the wheels without relying on the driver's brake operation. More specifically, during the adaptive cruise control, the brake control section 62b controls the operation of each of the components of the hydraulic pressure control unit 50 such that the deceleration of the motorcycle 100 becomes the target deceleration, which is calculated on the basis of the distance from the motorcycle 100 to the preceding vehicle and the relative speed between the motorcycle 100 and the preceding vehicle. In this way, the brake control section 62*b* controls the braking force generated on each of the wheels.

For example, during the adaptive cruise control, the brake control section 62*b* brings the motorcycle 100 into a state where the inlet valves 31 are opened, the outlet valves 32 are closed, the first valves 35 are closed, and the second valves 36 are opened, and drives the pumps 34 in such a state, so as to increase the hydraulic pressure of the brake fluid in each of the wheel cylinders 24 and generate the braking force on each of the wheels. In addition, the brake control section 62*b* regulates the hydraulic pressure of the brake fluid in each of the wheel cylinders 24 by controlling an opening amount of the first valve 35, for example. In this way, the brake control section 62*b* can control the braking force generated on each of the wheels.

Here, during the adaptive cruise control, the brake control section 62*b* separately controls operation of the front-wheel brake mechanism 12 and the rear-wheel brake mechanism 14, so as to separately control the hydraulic pressure of the brake fluid in each of the wheel cylinders 24 of the front-wheel brake mechanism 12 and the rear-wheel brake mechanism 14. In this way, the brake control section 62*b* can control braking force distribution that is distribution of the braking force generated on the wheels to the front and rear wheels (that is, distribution of the braking force generated on the front wheel 3 and the braking force generated on the rear wheel 4). More specifically, the brake control section 62*b* controls the braking force distribution between the front and rear wheels such that a total of target braking force values generated on the wheels becomes equal to a requested braking force (that is, the braking force that is requested at the time of braking during the adaptive cruise control) corresponding to the target deceleration. The requested braking force is specifically the required braking force to bring the deceleration of the motorcycle 100 to the target deceleration, which is calculated on the basis of the distance from the motorcycle 100 to the preceding vehicle and the relative speed between the motorcycle 100 and the preceding vehicle.

Note that, in the case where at least one of the wheels is locked or possibly locked, the brake control section 62*b* may execute the anti-lock brake control. The anti-lock brake control is control for regulating the braking force of the wheel, which is locked or possibly locked, to such a magnitude that locking of the wheel can be avoided.

For example, during the anti-lock brake control, the brake control section 62*b* brings the motorcycle 100 into a state where the inlet valves 31 are closed, the outlet valves 32 are opened, the first valves 35 are opened, and the second valves 36 are closed, and drives the pumps 34 in such a state, so as to reduce the hydraulic pressure of the brake fluid in each of the wheel cylinders 24 and reduce the braking force generated on each of the wheels. In addition, the brake control section 62*b* closes both of the inlet valves 31 and the outlet valves 32 from the above state, for example. In this way, the brake control section 62*b* can keep the hydraulic pressure of the brake fluid in each of the wheel cylinders 24 and thus can keep the braking force generated on the each of wheels. Furthermore, the brake control section 62*b* opens the inlet valves 31 and closes the outlet valves 32 from the above state, for example. In this way, the brake control section 62*b* can increase the hydraulic pressure of the brake fluid in each of the wheel cylinders 24 and thus can increase the braking force generated on each of the wheels.

As described above, in the controller 60, the control section 62 can execute the adaptive cruise control. Here, during the adaptive cruise control, the control section 62 controls at least one of the braking force distribution and the drive power distribution between the front and rear wheels on the basis of the lateral acceleration of the motorcycle 100. As a result, the motorcycle 100 can appropriately corner during the adaptive cruise control of the motorcycle 100. A detailed description will be made below on processing relating to such braking force distribution control based on the lateral acceleration and processing relating to such drive power distribution control based on the lateral acceleration during the adaptive cruise control executed by the controller 60.

Note that, as the lateral acceleration of the motorcycle 100 that is referred in the braking force distribution control and the drive power distribution control, the control section 62 may use the detection result of the lateral acceleration sensor 46 or may use a value that is calculated by using another type of information acquired by the controller 60. For example, the control section 62 may calculate a vehicle speed on the basis of the front-wheel rotational frequency sensor 43 and the rear-wheel rotational frequency sensor 44, and then may calculate the lateral acceleration on the basis of the vehicle speed and a turning radius. For example, the turning radius can be acquired by using a signal received from the Global Positioning System (GPS) satellite.

In the motorcycle 100 described above, the braking force generated on each of the wheels can separately be controlled between the front and rear wheels, and the drive power transmitted to each of the wheels can also separately be controlled between the front and rear wheels. However, in the straddle-type vehicle using the controller according to the present invention, at least one of the braking force and the drive power only needs to be separately controllable between the front and rear wheels. Thus, the straddle-type vehicle using the controller according to the present invention may be a straddle-type vehicle on which the engine is mounted as the drive source and in which the drive power is transmitted only to the rear wheel 4 from the engine, for example.

The description has been made above on the example in which the drive control section 62*a* controls the operation of the motors 5, 6 via the motor control unit. However, the drive control section 62*a* may output a signal for controlling the operation of the motors 5, 6, so as to directly control the operation of the motors 5, 6. In such a case, similar to the operation of the motors 5, 6 during the adaptive cruise control, the operation of the motors 5, 6 in the normal time is also controlled by the drive control section 62*a*.

<Operation of Controller>

A description will be made on operation of the controller 60 according to the embodiment of the present invention with reference to FIG. 5 to FIG. 8.

FIG. 5 is a flowchart of an exemplary processing flow relating to the braking force distribution control that is based on the lateral acceleration and executed by the controller 60. More specifically, the control flow illustrated in FIG. 5 is repeatedly executed during the adaptive cruise control. In addition, step S510 and step S590 in FIG. 5 respectively correspond to initiation and termination of the control flow illustrated in FIG. 5. FIG. 6 is a view for illustrating directions of the braking forces generated on the front wheel 3 and the rear wheel 4 during cornering.

When the control flow illustrated in FIG. 5 is initiated, in step S511, the control section 62 determines whether the lean angle of the motorcycle 100 is smaller than a first reference angle. If it is determined that the lean angle of the motorcycle 100 is smaller than the first reference angle (step S511/YES), the processing proceeds to step S513. On the other hand, if it is determined that the lean angle of the motorcycle 100 is equal to or larger than the first reference angle (step S511/NO), the processing proceeds to step S515.

During cornering, when passing an entry of a curved road (that is, when the motorcycle 100 passes the entry of the curved road), the driver leans the motorcycle 100 while decelerating the motorcycle 100. In this way, the lean angle is increased. Then, after the motorcycle 100 finishes passing the entry of the curved road, the driver maintains the lean angle while the motorcycle 100 is traveling on the curved road (more specifically, in a period from time at which the motorcycle 100 passes the entry of the curved road to time at which the motorcycle 100 enters an exit thereof). In such a state, the motorcycle 100 is automatically accelerated or decelerated. Here, the entry of the curved road means a connected portion between the curved road and a straight road that is located behind the curved road and is connected thereto. In addition, when the motorcycle 100 is passing the entry of the curved road, the adaptive cruise control is executed, and the acceleration or the deceleration of the motorcycle 100 is controlled. As a result, the motorcycle 100 is decelerated.

More specifically, the first reference angle described above is set to an angle with which it is possible to appropriately determine whether a current time point is the time at which the motorcycle 100 is passing the entry of the curved road or the time at which the motorcycle 100 finishes passing the entry of the curved road under a situation where the motorcycle 100 is decelerated during cornering. For example, the first reference angle is set to a smaller angle than an average angle that is estimated as the lean angle of the motorcycle 100 leaned by the driver when the motorcycle 100 passes the entry of the curved road. Thus, if it is determined YES in step S511 under the situation where the motorcycle 100 is decelerated during cornering, it is possible to determine that the current time point is the time at which the motorcycle 100 is passing the entry of the curved road. On the other hand, if it is determined NO in step S511, it is possible to determine that the current time point is the time at which the motorcycle 100 is traveling on the curved road.

If it is determined YES in step S511, in step S513, the brake control section 62b switches a control mode of the braking force distribution to a first braking mode.

In the first braking mode, the brake control section 62b controls the braking force distribution such that the lateral acceleration becomes such acceleration that increases the lean angle of the motorcycle 100.

Here, the description will be made on the directions of the braking forces generated on the front wheel 3 and the rear wheel 4 during cornering with reference to FIG. 6. FIG. 6 illustrates a state where the braking force is generated on each of the wheels under a situation where the motorcycle 100 turns in a left direction with respect to an advancing direction D1.

As illustrated in FIG. 6, during cornering, a direction of a braking force FB_f generated on the front wheel 3 differs from a direction of a braking force FB_r generated on the rear wheel 4. For example, in the case where the motorcycle 100 turns in the left direction with respect to the advancing direction D1, as illustrated in FIG. 6, the braking force FB_f generated on the front wheel 3 has: a component FB_fx in a reverse direction from the advancing direction D1; and a component FB_fy that is orthogonal to the component FB_fx and is in a right direction with respect to the advancing direction D1. Meanwhile, the braking force FB_r generated on the rear wheel 4 has: a component FB_rx in the reverse direction from the advancing direction D1; and a component FB_ry that is orthogonal to the component FB_rx and is in the left direction with respect to the advancing direction D1.

For example, in the case where the motorcycle 100 turns in the left direction with respect to the advancing direction D1, the motorcycle 100 is leaned in the left direction with respect to the advancing direction D1. Since the braking force FB_f generated on the front wheel 3 has the component FB_fy in the right direction with respect to the advancing direction D1, the braking force FB_f acts in a direction to reduce the lean angle of the motorcycle 100 (in other words, a direction to stand the motorcycle 100 up). Meanwhile, since the braking force FB_r generated on the rear wheel 4 has the component FB_ry in the left direction with respect to the advancing direction D1, the braking force FB_r acts in a direction to increase the lean angle of the motorcycle 100 (in other words, a direction to lean the motorcycle 100).

Note that, also in the case where the motorcycle 100 turns in the right direction with respect to the advancing direction D1, similar to the case where the motorcycle 100 turns in the left direction with respect to the advancing direction D1, the braking force generated on the front wheel 3 acts in the direction to reduce the lean angle of the motorcycle 100, and the braking force generated on the rear wheel 4 acts in the direction to increase the lean angle of the motorcycle 100.

More specifically, in the first braking mode, the brake control section 62b controls the braking force distribution such that a direction of a component of the lateral acceleration in the motorcycle 100 corresponding to lateral components of the braking forces generated on the front wheel 3 and the rear wheel 4 (that is, components in the vehicle width direction) matches a lean direction of the motorcycle 100 (for example, the left direction with respect to the advancing direction D1 in the example illustrated in FIG. 6).

For example, in the example illustrated in FIG. 6, the brake control section 62b preferentially distributes the braking force to the rear wheel 4 to the front wheel 3 (that is, a distribution ratio of the braking force distribution is set to be high for the rear wheel 4). In this way, the component FB_ry of the braking force FB_r generated on the rear wheel 4 can be made larger than the component FB_fy of the braking force FB_f generated on the front wheel 3. As a result, the direction of the component of the lateral acceleration in the motorcycle 100 that corresponds to the lateral components of the braking forces generated on the front wheel 3 and the rear wheel 4 can be set to the left direction with respect to the advancing direction D1. In this way, a force that leans the motorcycle 100 can be generated.

Here, the case where it is determined YES in step S511 under the situation where the motorcycle 100 is decelerated during cornering corresponds to the case where the current time point is the time at which the motorcycle 100 is passing the entry of the curved road as described above. Thus, more specifically, under the situation where the motorcycle 100 is decelerated during cornering, the first braking mode is executed when the motorcycle 100 is passing the entry of the curved road. As a result, the force that leans the motorcycle 100 can be generated when motorcycle 100 is passing the entry of the curved road. Thus, behavior of the motorcycle 100 in the rolling direction can be controlled according to the driver's intention.

Note that, from a perspective of suppressing falling of the motorcycle 100, in the first braking mode, the brake control section 62b preferably controls the braking force distribution such that the component of the lateral acceleration in the motorcycle 100 corresponding to the lateral components of the braking forces generated on the front wheel 3 and the rear wheel 4 becomes equal to or lower than an upper limit value of such extent that can appropriately suppress the falling of the motorcycle 100.

If it is determined NO in step S511, in step S515, the brake control section 62b switches the control mode of the braking force distribution to a second braking mode.

In the second braking mode, the brake control section 62b controls the braking force distribution such that the lateral acceleration is maintained.

More specifically, in the second braking mode, the brake control section 62b controls the braking force distribution such that the lateral acceleration is maintained without relying on the braking forces generated on the front wheel 3 and the rear wheel 4.

For example, in the example illustrated in FIG. 6, the brake control section 62b controls the braking force distribution such that a magnitude of the component FB_fy of the braking force FB_f generated on the front wheel 3 matches a magnitude of the component FB_ry of the braking force FB_r generated on the rear wheel 4. As a result, the component FB_fy of the braking force FB_f generated on the front wheel 3 and the component FB_ry of the braking force FB_r generated on the rear wheel 4 can cancel each other out. Thus, the lateral acceleration of the motorcycle 100 can be maintained as a centrifugal force in the right direction with respect to the advancing direction D1, which is generated by turning of the motorcycle 100, without relying on the braking forces generated on the front wheel 3 and the rear wheel 4.

Here, the case where it is determined NO in step S511 under the situation where the motorcycle 100 is decelerated during cornering corresponds to the case where the current time point is the time at which the motorcycle 100 is traveling on the curved road as described above. Thus, the second braking mode is executed under the situation where the motorcycle 100 is decelerated during cornering, more specifically, when the motorcycle 100 is traveling on the curved road. As a result, the lateral acceleration of the motorcycle 100 can be maintained as the centrifugal force without relying on the braking forces generated on the front wheel 3 and the rear wheel 4 when the motorcycle 100 is traveling on the curved road. Thus, it is possible to suppress a change in the posture of the motorcycle 100 in the rolling direction against the driver's intention.

After step S513 or step S515, the control flow illustrated in FIG. 5 is terminated.

As described above, in the first braking mode and the second braking mode, the brake control section 62b controls the braking force distribution on the basis of the lateral acceleration of the motorcycle 100. In addition, the brake control section 62b controls the braking force distribution, which is controlled on the basis of the lateral acceleration, according to the lean angle of the motorcycle 100.

The description has been made above on the example in which the control mode of the braking force distribution is switched according to the comparison result between the lean angle of the motorcycle 100 and the first reference angle. However, a trigger to switch the control mode of the braking force distribution is not limited to the above example.

For example, the brake control section 62b may identify a position of the motorcycle 100 on the curved road and may switch the control mode of the braking force distribution according to the identified position of the motorcycle 100. More specifically, in the case where it is determined that the motorcycle 100 is passing the entry of the curved road on the basis of the identified position of the motorcycle 100, the brake control section 62b switches the control mode of the braking force distribution to the first braking mode. Meanwhile, in the case where it is determined that the motorcycle 100 finishes passing the entry and is traveling on the curved road on the basis of the identified position of the motorcycle 100, the brake control section 62b switches the control mode of the braking force distribution to the second braking mode. Note that the position of the motorcycle 100 on the curved road can be identified, for example, by using the signal received from the GPS satellite, by recognizing a shape of a travel road ahead by using the image in front of the motorcycle 100 captured by the camera, or the like.

FIG. 7 is a flowchart of an exemplary processing flow relating to the drive power distribution control that is based on the lateral acceleration and executed by the controller 60. More specifically, the control flow illustrated in FIG. 7 is repeatedly executed during the adaptive cruise control. In addition, step S610 and step S690 in FIG. 7 respectively correspond to initiation and termination of the control flow illustrated in FIG. 7. FIG. 8 is a view for illustrating directions of the drive power that acts on the front wheel 3 and the rear wheel 4 during cornering.

When the control flow illustrated in FIG. 7 is initiated, in step S611, the control section 62 determines whether the lean angle of the motorcycle 100 is equal to or larger than a second reference angle. If it is determined that the lean angle of the motorcycle 100 is equal to or larger than the second reference angle (step S611/YES), the processing proceeds to step S613. On the other hand, if it is determined that the lean angle of the motorcycle 100 is smaller than the second reference angle (step S611/NO), the processing proceeds to step S615.

Here, during cornering, as described above, after the motorcycle 100 finishes passing the entry of the curved road, the driver maintains the lean angle while the motorcycle 100 is traveling on the curved road. In such a state, the motorcycle 100 is automatically accelerated or decelerated. Then, at the time of passing an exit of the curved road (that is, when the motorcycle 100 passes the exit of the curved road), the driver stands the motorcycle 100 up while accelerating the motorcycle 100. In this way, the lean angle is reduced. Here, the exit of the curved road means a connected portion between the curved road and a straight road that is located ahead of the curved road and is connected thereto. In addition, when the motorcycle 100 is passing the exit of the curved road, the adaptive cruise control is executed, and the acceleration or the deceleration of the motorcycle 100 is controlled. As a result, the motorcycle 100 is accelerated.

More specifically, the second reference angle described above is set to an angle with which it is possible to appropriately determine whether the current time point is the time at which the motorcycle 100 is passing the exit of the curved road or the time before the motorcycle 100 enters the exit of the curved road under a situation where the motorcycle 100 is accelerated during cornering. For example, the second reference angle is set to a smaller angle than an average angle that is estimated as the lean angle of the motorcycle 100 that starts being stood up by the driver when the motorcycle 100 enters the exit of the curved road. Thus, if it is determined YES in step S611 under the situation where the motorcycle 100 is accelerated during cornering, it is possible to determine that the current time point is the time at which the motorcycle 100 is traveling on the curved road. On the other hand, if it is determined NO in step S611, it is possible to determine that the current time point is the time at which the motorcycle 100 is passing the exit of the curved road.

If it is determined YES in step S611, in step S613, the drive control section 62*a* switches a control mode of the drive power distribution to a first drive mode.

In the first drive mode, the drive control section 62*a* controls the drive power distribution such that the lateral acceleration is maintained.

Here, the description will be made on the directions of the drive power that acts on the front wheel 3 and the rear wheel 4 during cornering with reference to FIG. 8. FIG. 8 illustrates a state where the drive power acts on each of the wheels under the situation where the motorcycle 100 turns in the left direction with respect to the advancing direction D1.

As illustrated in FIG. 8, during cornering, a direction of drive power FD_f acting on the front wheel 3 differs from a direction of drive power FD_r acting on the rear wheel 4. For example, in the case where the motorcycle 100 turns in the left direction with respect to the advancing direction D1, as illustrated in FIG. 8, the drive power FD_f acting on the front wheel 3 has: a component FD_fx in the advancing direction D1; and a component FD_fy that is orthogonal to the component FD_fx and is in the left direction with respect to the advancing direction D1. Meanwhile, the drive power FD_r acting on the rear wheel 4 has: a component FD_rx in the advancing direction D1; and a component FD_ry that is orthogonal to the component FD_rx and is in the right direction with respect to the advancing direction D1.

For example, in the case where the motorcycle 100 turns in the left direction with respect to the advancing direction D1, the motorcycle 100 is leaned in the left direction with respect to the advancing direction D1. Since the drive power FD_f acting on the front wheel 3 has the component FD_fy in the left direction with respect to the advancing direction D1, the drive power FD_f acts in the direction to increase the lean angle of the motorcycle 100 (in other words, the direction to lean the motorcycle 100). Meanwhile, since the drive power FD_r acting on the rear wheel 4 has the component FD_ry in the right direction with respect to the advancing direction D1, the drive power FD_r acts in the direction to reduce the lean angle of the motorcycle 100 (in other words, the direction to stand the motorcycle 100 up).

Note that, also in the case where the motorcycle 100 turns in the right direction with respect to the advancing direction D1, similar to the case where the motorcycle 100 turns in the left direction with respect to the advancing direction D1, the drive power acting on the front wheel 3 acts in the direction to increase the lean angle of the motorcycle 100, and the drive power acting on the rear wheel 4 acts in the direction to reduce the lean angle of the motorcycle 100.

More specifically, in the first drive mode, the drive control section 62*a* controls the drive power distribution such that the lateral acceleration is maintained without relying on the drive power acting on the front wheel 3 and the rear wheel 4.

For example, in the example illustrated in FIG. 8, the drive control section 62*a* controls the drive power distribution such that a magnitude of the component FD_fy of the drive power FD_f acting on the front wheel 3 matches a magnitude of the component FD_ry of the drive power FD_r acting on the rear wheel 4. As a result, the component FD_fy of the drive power FD_f acting on the front wheel 3 and the component FD_ry of the drive power FD_r acting on the rear wheel 4 can cancel each other out. Thus, the lateral acceleration of the motorcycle 100 can be maintained as the centrifugal force in the right direction with respect to the advancing direction D1, which is generated by turning of the motorcycle 100, without relying on the drive power acting on the front wheel 3 and the rear wheel 4.

Here, the case where it is determined YES in step S611 under the situation where the motorcycle 100 is accelerated during cornering corresponds to the case where the current time point is the time at which the motorcycle 100 is traveling on the curved road as described above. Thus, the first drive mode is executed under the situation where the motorcycle 100 is accelerated during cornering, more specifically, when the motorcycle 100 is traveling on the curved road. As a result, the lateral acceleration of the motorcycle 100 can be maintained as the centrifugal force without relying on the drive power acting on the front wheel 3 and the rear wheel 4 when the motorcycle 100 is traveling on the curved road. Thus, it is possible to suppress the change in the posture of the motorcycle 100 in the rolling direction against the driver's intention.

If it is determined NO in step S611, in step S615, the drive control section 62*a* switches the control mode of the drive power distribution to a second drive mode.

In the second drive mode, the drive control section 62*a* controls the drive power distribution such that the lateral acceleration becomes such acceleration that reduces the lean angle of the motorcycle 100.

More specifically, in the second drive mode, the drive control section 62*a* controls the drive power distribution such that the direction of the component of the lateral acceleration in the motorcycle 100 corresponding to lateral components of the drive power acting on the front wheel 3 and the rear wheel 4 (that is, components in the vehicle width direction) matches a reverse direction from the lean direction of the motorcycle 100 (for example, the right direction with respect to the advancing direction D1 in the example illustrated in FIG. 8).

For example, in the example illustrated in FIG. 8, the drive control section 62*a* preferentially distributes the drive power to the rear wheel 4 to the front wheel 3 (that is, a distribution ratio of the drive power distribution is set to be high for the rear wheel 4). In this way, the component FD_ry of the drive power FD_r acting on the rear wheel 4 can be made larger than the component FD_fy of the drive power FD_f acting on the front wheel 3. As a result, the direction of the component of the lateral acceleration in the motorcycle 100 that corresponds to the lateral components of the drive power acting on the front wheel 3 and the rear wheel 4 can be set to the right direction with respect to the advancing direction D1. In this way, a force that stands the motorcycle 100 up can be generated.

Here, the case where it is determined NO in step S611 under the situation where the motorcycle 100 is accelerated during cornering corresponds to the case where the current time point is the time at which the motorcycle 100 is passing the exit of the curved road as described above. Thus, the second drive mode is executed under the situation where the motorcycle 100 is accelerated during cornering, more specifically, when the motorcycle 100 is passing the exit of the curved road. As a result, the force that stands the motorcycle 100 up can be generated when motorcycle 100 is passing the exit of the curved road. Thus, the behavior of the motorcycle 100 in the rolling direction can be controlled according to the driver's intention.

Note that, from the perspective of suppressing the falling of the motorcycle 100, in the second drive mode, the drive control section 62*a* preferably controls the drive power distribution such that the component of the lateral acceleration in the motorcycle 100 corresponding to the lateral components of the drive power acting on the front wheel 3 and the rear wheel 4 becomes equal to or lower than the upper limit value of such extent that can appropriately suppress the falling of the motorcycle 100.

After step S613 or step S615, the control flow illustrated in FIG. 7 is terminated.

As described above, in the first drive mode and the second drive mode, the drive control section 62*a* controls the drive power distribution on the basis of the lateral acceleration of the motorcycle 100. In addition, the drive control section 62*a* controls the drive power distribution, which is controlled on the basis of the lateral acceleration, according to the lean angle of the motorcycle 100.

The description has been made above on the example in which the control mode of the drive power distribution is switched according to the comparison result between the lean angle of the motorcycle 100 and the second reference angle. However, a trigger to switch the control mode of the drive power distribution is not limited to the above example.

For example, the drive control section 62*a* may identify the position of the motorcycle 100 on the curved road and may switch the control mode of the drive power distribution according to the identified position of the motorcycle 100. More specifically, in the case where it is determined that the motorcycle 100 is traveling on the curved road before entering the exit on the basis of the identified position of the motorcycle 100, the drive control section 62*a* switches the control mode of the drive power distribution to the first drive mode. Meanwhile, in the case where it is determined that the motorcycle 100 is passing the exit of the curved road on the basis of the identified position of the motorcycle 100, the drive control section 62*a* switches the control mode of the drive power distribution to the second drive mode.

<Effects of Controller>

A description will be made on effects of the controller 60 according to the embodiment of the present invention.

In the controller 60, during the adaptive cruise control, the control section 62 controls at least one of the braking force distribution, which is the distribution of the braking forces generated on the wheels of the motorcycle 100 to the front and rear wheels, and the drive power distribution, which is the distribution of the drive power transmitted to the wheels to the front and rear wheels, on the basis of the lateral acceleration of the motorcycle 100. In this way, during cornering, it is possible to suppress the motorcycle 100 from exhibiting the behavior in the rolling direction that is unintended by the driver and is caused when the braking force or the drive power is automatically exerted on the motorcycle 100. Therefore, the motorcycle 100 can appropriately corner during the adaptive cruise control of the motorcycle 100.

In the controller 60, the control section 62 preferably controls the braking force distribution or the drive power distribution, which is controlled on the basis of the lateral acceleration, according to the lean angle of the motorcycle 100. In this way, the braking force distribution or the drive power distribution, which is controlled according to the lateral acceleration, can appropriately be controlled according to the position of the motorcycle 100 on the curved road. Thus, during cornering, it is possible to further appropriately suppress the motorcycle 100 from exhibiting the behavior in the rolling direction that is unintended by the driver and is caused when the braking force or the drive power is automatically exerted on the motorcycle 100. Therefore, the motorcycle 100 can appropriately corner during the adaptive cruise control of the motorcycle 100.

In the case where the lean angle of the motorcycle 100 is smaller than the first reference angle, the control section 62 of the controller 60 preferably executes the first braking mode in which the braking force distribution is controlled such that the lateral acceleration becomes such acceleration that increases the lean angle of the motorcycle 100. In this way, the first braking mode can be executed when the motorcycle 100 is passing the entry of the curved road where the driver leans the motorcycle 100. As a result, the force that leans the motorcycle 100 can be generated when motorcycle 100 is passing the entry of the curved road. Thus, the behavior of the motorcycle 100 in the rolling direction can be controlled according to the driver's intention.

In the case where the lean angle of the motorcycle 100 is equal to or larger than the first reference angle, the control section 62 of the controller 60 preferably executes the second braking mode in which the braking force distribution is controlled such that the lateral acceleration is maintained. In this way, the second braking mode can be executed when the motorcycle 100 is traveling on the curved road where the driver maintains the lean angle of the motorcycle 100. As a result, the lateral acceleration of the motorcycle 100 can be maintained as the centrifugal force without relying on the braking forces generated on the front wheel 3 and the rear wheel 4 when the motorcycle 100 is traveling on the curved road. Thus, it is possible to suppress the change in the posture of the motorcycle 100 in the rolling direction against the driver's intention.

In the case where the lean angle of the motorcycle 100 is equal to or larger than the second reference angle, the control section 62 of the controller 60 preferably executes the first drive mode in which the drive power distribution is controlled such that the lateral acceleration is maintained. In this way, the first drive mode can be executed when the motorcycle 100 is traveling on the curved road where the driver maintains the lean angle of the motorcycle 100. As a result, the lateral acceleration of the motorcycle 100 can be maintained as the centrifugal force without relying on the drive power acting on the front wheel 3 and the rear wheel 4 when the motorcycle 100 is traveling on the curved road. Thus, it is possible to suppress the change in the posture of the motorcycle 100 in the rolling direction against the driver's intention.

In the case where the lean angle of the motorcycle 100 is smaller than the second reference angle, the control section 62 of the controller 60 preferably executes the second drive mode in which the drive power distribution is controlled such that the lateral acceleration becomes such acceleration that reduces the lean angle of the motorcycle 100. In this way, the second drive mode can be executed when the motorcycle 100 is passing the exit of the curved road where the driver stands the motorcycle 100 up. As a result, the force that stands the motorcycle 100 up can be generated when motorcycle 100 is passing the exit of the curved road. Thus, the behavior of the motorcycle 100 in the rolling direction can be controlled according to the driver's intention.

The present invention is not limited to each of the embodiments that have been described. For example, all or parts of the embodiments may be combined, or only a part of each of the embodiments may be implemented.

REFERENCE SIGNS LIST

1: Trunk
2: Handlebar

3: Front wheel
3a: Rotor
4: Rear wheel
4a: Rotor
5: Motor
6: Motor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Inter-vehicular distance sensor
42: Input device
43: Front-wheel rotational frequency sensor
44: Rear-wheel rotational frequency sensor
45: Inertial measurement unit
46: Lateral acceleration sensor
48: Master-cylinder pressure sensor
49: Wheel-cylinder pressure sensor
50: Hydraulic pressure control unit
51: Base body
60: Controller
61: Acquisition section
62: Control section
62a: Drive control section
62b: Brake control section
100: Motorcycle

The invention claimed is:

1. A controller (60) that controls travel of a straddle-type vehicle (100), the controller comprising:
a control section (62) capable of executing adaptive cruise control in which the straddle-type vehicle (100) is made to travel according to a distance from said straddle-type vehicle (100) to a preceding vehicle, motion of said straddle-type vehicle (100), and a driver's instruction, wherein
during the adaptive cruise control, the control section (62) controls, using a lean angle and a lateral acceleration of the straddle-type vehicle (100) and at least one of a first reference angle and a second reference angle, braking force distribution, which is distribution of braking forces generated a front wheel (3) and a rear wheel (4) of the straddle-type vehicle (100),
wherein in the case where the lean angle of the straddle-type vehicle (100) is smaller than the first reference angle, the control section (62) determines the straddle-type vehicle (100) is passing an entry of a curved road and executes a first braking mode in which the braking force distribution is controlled such that the lateral acceleration becomes such acceleration that increases the lean angle of the straddle-type vehicle (100), and
wherein in the case where the lean angle of the straddle-type vehicle (100) is equal to or larger than the first reference angle, the control section (62) determines the straddle-type vehicle (100) is passing the entry of the curved road and executes a second braking mode in which the braking force distribution is controlled such that the lateral acceleration is maintained.

2. The controller according to claim 1, wherein in the case where the lean angle of the straddle-type vehicle (100) is equal to or larger than the second reference angle, the control section (62) executes a first drive mode in which the drive power distribution is controlled such that the lateral acceleration is maintained.

3. The controller according to claim 2, wherein the first drive mode is executed when the straddle-type vehicle (100) is traveling on a curved road.

4. The controller according to claim 2, wherein in the case where the lean angle of the straddle-type vehicle (100) is smaller than the second reference angle, the control section (62) executes a second drive mode in which the drive power distribution is controlled such that the lateral acceleration becomes such acceleration that reduces the lean angle of the straddle-type vehicle (100).

5. The controller according to claim 4, wherein the second drive mode is executed when the straddle-type vehicle (100) is passing an exit of a curved road.

6. The controller according to claim 1, wherein in the case where the lean angle of the straddle-type vehicle (100) is smaller than the second reference angle, the control section (62) executes a second drive mode in which the drive power distribution is controlled such that the lateral acceleration becomes such acceleration that reduces the lean angle of the straddle-type vehicle (100).

7. The controller according to claim 1, wherein a braking mode for the braking force distribution of the straddle-type vehicle (100) is controlled based on the first reference angle, and wherein a drive mode for the drive power distribution of the straddle-type vehicle (100) is controlled based on the second reference angle.

8. A control method for controlling travel of a straddle-type vehicle (100), the control method comprising:
controlling, using a lean angle and a lateral acceleration of the straddle-type vehicle (100) and at least one of a first reference angle and a second reference angle, braking force distribution, which is distribution of braking forces generated on a front wheel (3) and a rear wheel (4) of the straddle-type vehicle (100), by a controller (60) during adaptive cruise control in which the straddle-type vehicle (100) is made to travel according to a distance from said straddle-type vehicle (100) to a preceding vehicle, motion of said straddle-type vehicle (100), and a driver's instruction,
wherein the controller (60), in the case where the lean angle of the straddle-type vehicle (100) is smaller than a first reference angle, determines that the straddle-type vehicle (100) is passing an entry of a curved road, and executes a first braking mode in which the braking force distribution is controlled such that the lateral acceleration becomes such acceleration that increases the lean angle of the straddle-type vehicle (100); and
wherein the controller (60), in the case where the lean angle of the straddle-type vehicle (100) is equal to or larger than the first reference angle, determines that the straddle-type vehicle (100) is traveling on the curved road, and executes a second braking mode in which the braking force distribution is controlled such that the lateral acceleration is maintained.

* * * * *